(12) United States Patent
Akkary et al.

(10) Patent No.: US 7,711,932 B2
(45) Date of Patent: May 4, 2010

(54) SCALABLE RENAME MAP TABLE RECOVERY

(75) Inventors: Haitham H. Akkary, Portland, OR (US); Ravi Rajwar, Portland, OR (US); Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1403 days.

(21) Appl. No.: 10/724,876

(22) Filed: Dec. 2, 2003

(65) Prior Publication Data

US 2005/0120192 A1  Jun. 2, 2005

(51) Int. Cl.
*G06F 9/44* (2006.01)
*G06F 9/00* (2006.01)

(52) U.S. Cl. .................................. 712/228; 712/239
(58) Field of Classification Search ................ 712/228, 712/229, 239
See application file for complete search history.

(56) References Cited

U.S. PATENT DOCUMENTS

| | | | | |
|---|---|---|---|---|
| 5,497,499 | A * | 3/1996 | Garg et al. ................. | 712/217 |
| 5,737,624 | A * | 4/1998 | Garg et al. ................. | 712/23 |
| 5,784,589 | A * | 7/1998 | Bluhm ........................ | 712/217 |
| 5,867,724 | A * | 2/1999 | McMahon ................... | 712/22 |
| 5,946,718 | A * | 8/1999 | Green ........................ | 711/207 |
| 5,961,636 | A * | 10/1999 | Brooks et al. .............. | 712/228 |
| 5,974,526 | A * | 10/1999 | Garg et al. ................. | 712/23 |
| 6,301,647 | B1 * | 10/2001 | Green ........................ | 711/207 |
| 6,351,797 | B1 * | 2/2002 | Beard et al. ................ | 711/207 |
| 6,591,342 | B1 | 7/2003 | Akkary et al. | |
| 6,662,273 | B1 * | 12/2003 | Wilkerson et al. .......... | 711/133 |
| 2001/0005880 | A1 * | 6/2001 | Ando .......................... | 712/34 |

OTHER PUBLICATIONS

Dirk Grunwald, Artur Klauser, Srilatha Manne, and Andrew Pleszkun's "Confidence Estimation of Speculation Control" IEEE © 1998. pp. 122-131.*

Scott McFarling's "Combining Branch Predictors" Digital Western Research Laboratory © 1993. pp. 1-20.*

Adrian Cristal, Matea Valero, Antonio M. Gonzalez, and Josep Llosa's "Large Virtual ROBs by Processor Checkpointing" © Sep. 2002. pp. 1-22.*

Andreas Moshovos's "Checkpointing Alternatives for High Performance, Power-Aware Processors" ACM © Aug. 2003. pp. 318-321.*

Balasubramonian et al., "Reducing the Complexity of the Register File in Dynamic Superscalar Processors", In *Proceedings of the 34th International Symposium on Microarchitecture*, Dec. 2001, pp. 237-248.

Brekelbaum et al., "Hierarchical Scheduling Windows", In *Proceedings of the 35th International Symposium on Microarchitecture*, Nov. 2002, pp. 27-36.

Brown et al., "Select-Free Instruction Scheduling Logic", In *Proceedings of the 34th International Symposium on Microarchitecture*, Dec. 2001, pp. 204-213.

(Continued)

*Primary Examiner*—Aimee J Li
(74) *Attorney, Agent, or Firm*—Erik R. Nordstrom (57) ABSTRACT

Checkpoints may be used to recover from branch mispredictions using scalable rename map table recovery.

22 Claims, 9 Drawing Sheets

OTHER PUBLICATIONS

Zalamea et al., "Two-level Hierarchical Register File Organization for VLIW Processors", In *Proceedings of the 33rd International Symposium on Microarchitecture*, Dec. 2000, pp. 137-146.

Canal et al., "A Low-Complexity Issue Logic", In *Proceedings of the 2000 International Conference on Supercomputing*, Jun. 2000, pp. 327-335.

Capitanio et al., "Partitioned Register Files for VLIWs: A Preliminary Analysis of Tradeoffs", In *Proceedings of the 25th Int'l Symposium on Microarchitecture*, Dec. 1992, pp. 292-300.

Gopal et al., "Speculative Versioning Cache", In *Proceedings of the Fourth International Symposium on High-Performance Computer Architecture*, Feb. 1998, pp. 195-205.

Hammond et al., "Data Speculation Support for a Chip Multiprocessor", In *Proceedings of the Eighth Symposium on Architectural Support for Programming Languages and Operating Systems*, Oct. 1998, pp. 58-69.

Henry et al., "Circuits for Wide-Window Superscalar Processors", In *Proceedings of the 27th Annual International Symposium on Computer Architecture*, Jun. 2000, pp. 236-247.

Hinton et al., "The Microarchitecture of the Pentium® 4 Processor", *Intel Technology Journal* Q1, Feb. 2001, pp. 1-13.

Jacobsen et al., "Assigning Confidence to Conditional Branch Predictions", In *Proceedings of the 29th International Symposium on Microarchitecture*, Dec. 1996, pp. 142-152.

Karkhanis et al., "A Day in the Life of a Data Cache Miss", In *Workshop on Memory Performance Issues*, 2002, pp. 1-10.

Knight, "An Architecture for Mostly Functional Languages", In *Proceedings of ACM Lisp and Functional Programming Conference*, Aug. 1986, pp. 500-519 (reprint pp. 105-112).

Lebeck et al., "A Large, Fast Instruction Window for Tolerating Cache Misses", In *Proceedings of the 29th Annual International Symposium on Computer Architecture*, May 2002, pp. 59-70.

Leibholz et al., "The Alpha 21264: A 500 MHz Out-of-Order Execution Microprocessor", In *Proceedings of the 42nd IEEE Computer Society International Conference* (COMPCON), Feb. 1997, pp. 28-36.

Martinez et al., "Cherry: Checkpointed Early Resource Recycling in Out-of-order Microprocessors", In *Proceedings of the 35th International Symposium on Microarchitecture*, Nov. 2002, pp. 3-14.

Michaud et al., "Data-Flow Prescheduling for Large Instruction Windows in Out-of-Order Processors", In *Proceedings of the Seventh International Symposium on High-Performance Computer Architecture*, Jan. 2001, pp. 27-36.

Moudgill et al., "Register Renaming and Dynamic Speculation: An Alternative Approach", In *Proceedings of the 26th International Symposium on Microarchitecture*, Dec. 1993, pp. 202-213.

Palacharla et al., "Complexity-Effective Superscalar Processors", In *Proceedings of the 24th Annual International Symposium on Computer Architecture*, Jun. 1997, pp. 206-218.

Ranganathan et al., "Using Speculative Retirement and Larger Instruction Windows to Narrow the Performance Gap between Memory Consistency Models", In *Proceedings on the 9th Annual ACM Symposium on Parallel Algorithms and Architectures*, Jun. 1997, pp. 199-210.

Rotenberg et al., "Trace Processors",In *Proceedings of the 30th International Symposium on Microarchitecture*, Jun. 1997, pp. 138-148.

Smith et al., "Implementation of Precise Interrupts in Pipelined Processors", In *Proceedings of the 12th Annual International Symposium on Computer Architecture*, Jun. 1985, pp. 36-44.

Sprangle et al., "Increasing Processor Performance by Implementing Deeper Pipelines", In *Proceedings of the 29th Annual International Symposium on Computer Architecture*, May 2002, pp. 25-34.

Steffan et al., "A Scalable Approach to Thread-Level Speculation", In *Proceedings of the 27th Annual International Symposium on Computer Architecture*, Jun. 2000, pp. 1-12.

Tendler et al., "POWER4 System Microarchitecture", IBM J. Res. & Dev., vol. 46, No. 1, Jan. 2002, pp. 5-25.

Vijayan et al., "Out-of-Order Commit Logic With Precise Exception Handling For Pipelined Processors", In *Poster in High Performance Computer Conference*, Dec. 2002.

Hwu et al., "Checkpoint Repair for Out-of-order Execution Machines", In *Proceedings of the 14th Annual International symposium on Computer architecture*, 1987, pp. 18-26.

Yeager, "The MIPS R10000 Superscalar Microprocessor", IEEE Micro, Apr. 1996, pp. 28-40.

\* cited by examiner

SCALABLE RENAME MAP TABLE RECOVERY

BACKGROUND OF THE INVENTION

Some embodiments of the present invention are generally related to microprocessors, and more particularly, to microprocessors capable of pipelined execution with branch misprediction recovery.

Modern microprocessors may achieve high frequencies by incorporating deep pipelines. These microprocessors may also expose instruction level parallelism (ILP) by predicting branches and speculatively executing past unresolved branches. One consequence of speculative execution may be branch misprediction. Branch mispredictions may greatly contribute to performance degradation, especially in microprocessor architectures that use deep pipelines.

BRIEF SUMMARY OF THE INVENTION

Checkpoints may be used to recover from branch mispredictions using scalable rename map table recovery.

BRIEF DESCRIPTION OF THE DRAWINGS

The invention shall be described with reference to the accompanying figures, wherein.

The invention is now described with reference to the accompanying drawings. In the drawings, like reference numbers generally indicate identical, functionally similar, and/or structurally similar elements. The drawing in which an element first appears is generally indicated by the left-most digit(s) in the corresponding reference number.

DETAILED DESCRIPTION OF PREFERRED EMBODIMENTS

While the present invention is described in terms of the examples below, this is for convenience only and is not intended to limit its application. In fact, after reading the following description, it will be apparent to one skilled in the relevant art(s) how to implement the following invention in alternative embodiments (e.g., providing a recovery mechanism using an alternative checkpoint generation mechanism).

Furthermore, while the following description focuses on the recovery of instructions in a microprocessor using a form of an Itanium® Processor Family (IPF) compatible processor or in a Pentium® compatible processor family (both manufactured by Intel® Corporation, Santa Clara, Calif.), it is not intended to limit the application of the present invention. It will be apparent to one skilled in the relevant art how to implement the following invention, where appropriate, in alternative embodiments. For example, the present invention may be applied, alone or in combination, with various microprocessor architectures and their inherent features, such as, but not limited to, complex instruction set (CISC), reduced instruction set (RISC), very long instruction word (VLIW), and explicitly parallel instruction computing (EPIC).

Figure 1:
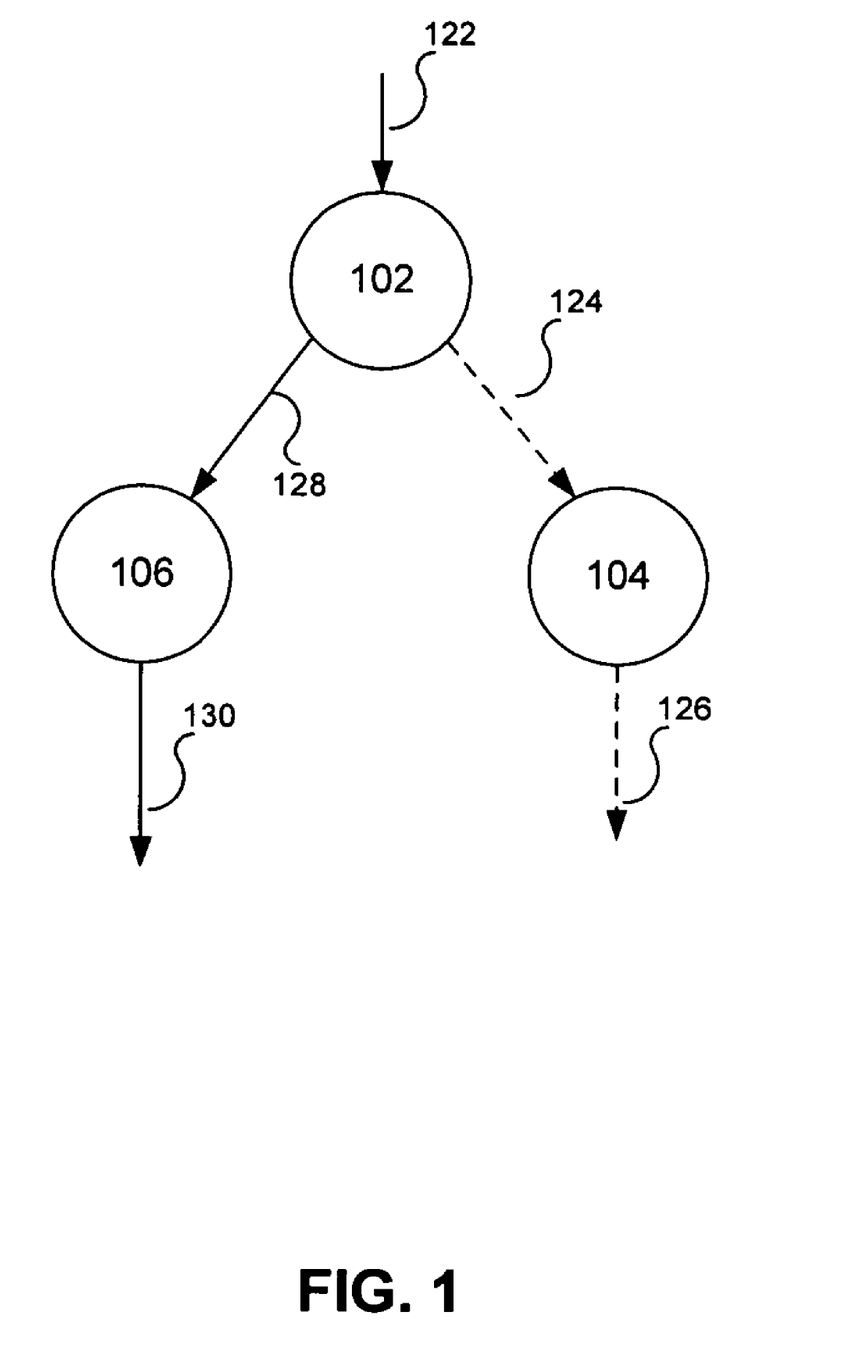
FIG. 1 illustrates a diagram of branch misprediction recovery in a program, according to an embodiment of the present invention.

With respect to FIG. 1, a diagram of branch misprediction recovery in a program is shown, according to an embodiment of the present invention. In this diagram, circles, such as 102, 104, and 106, may indicate software program basic blocks, and connecting arrows, such as arrows 122, 124, 126, 128, and 130, may indicate connections that do not include any program instructions.

FIG. 1 shows basic block 102 ending with a branch instruction, with conditional paths 124 and 128 emerging from the basic block 102. During a given iteration, a branch predictor may make a misprediction of the result of the branch ending basic block 102 and send the execution flow down the mispredicted path including basic block 104. Subsequent processing may occur further along the mispredicted path, as indicated by path 126.

According to an embodiment of the present invention, a checkpoint may be set at basic block 102, storing information that would enable recovery from a recovery event, such as, but not limited to a branch misprediction, fault, or other error. Upon the occurrence of a recovery event, the execution of the basic blocks of the mispredicted path along the mispredicted branch point may need to be discarded. Then, the blocks from the correct path 128, such as block 106, may need to be fetched into the pipeline.

Figure 2:
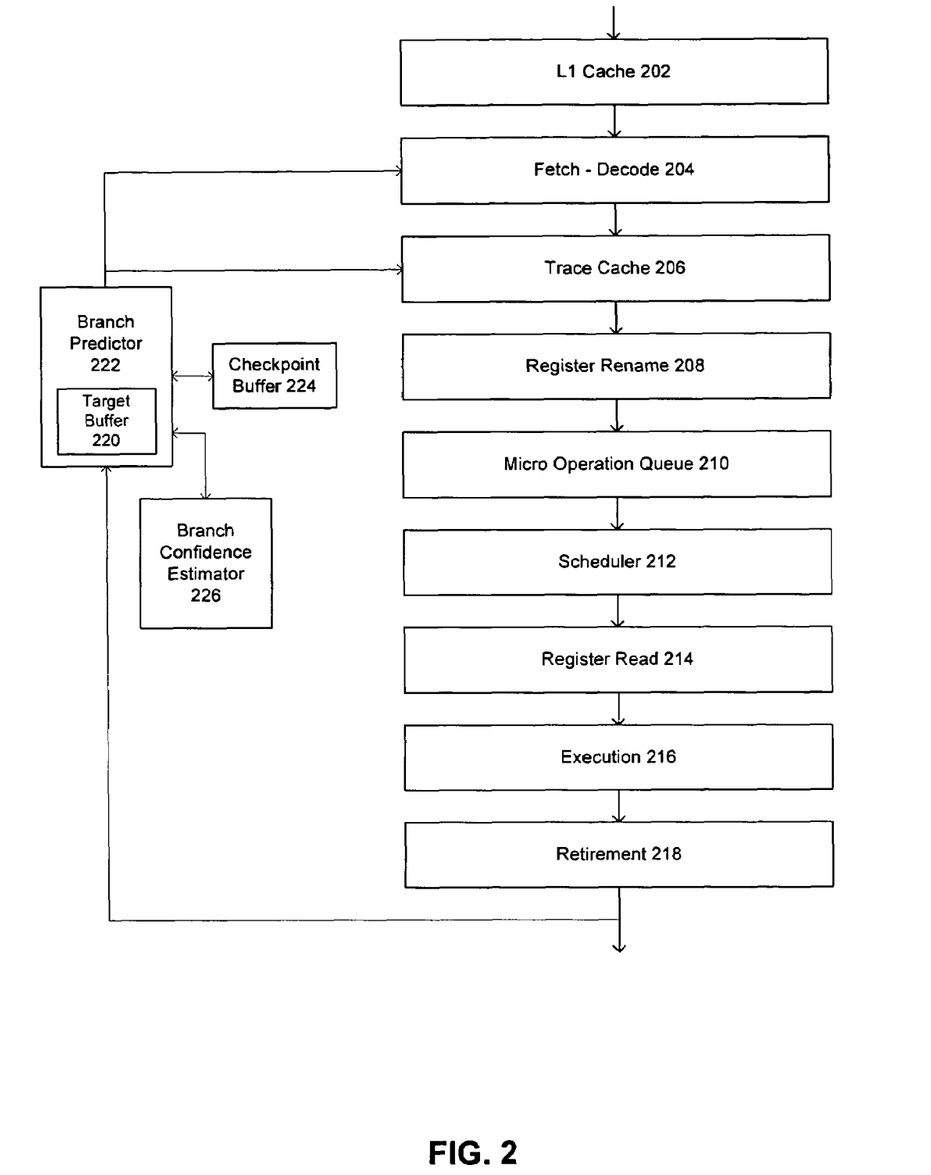
FIG. 2 illustrates a diagram of portions of a pipeline in a processor adapted for scalable rename map table recovery, according to an embodiment of the present invention.

Referring to FIG. 2, a diagram of portions of a pipeline in a processor adapted for scalable rename map table recovery is shown, according to an embodiment of the present invention. A L1 cache 202 may store instructions which may be fetched and decoded by a fetch-decode stage 204. Decoded instructions may be stored in a trace cache 206 or other form of instruction buffer. These instructions may have their operand logical registers mapped to operand physical registers in a register rename stage 208. The decoded and register-renamed instructions may be stored in a micro-operation queue 210 before being scheduled for execution in a scheduler stage 212. Once scheduled for execution, the instructions may read the operand registers in register read stage 214 before being executed in one or more execution units 216. If exceptions are not raised in the retirement stage 218, then the results of the execution may be used to update the machine state, which may include writing results to destination operand registers.

In many embodiments, the true results of a conditional branch instruction may not be known until the instruction executes and retires, and a branch target buffer (BTB) 220 and branch predictor 222 may be used to issue branch predictions to the fetch-decode stage 204 or, in some embodiments, to the trace cache 206. The branch prediction may take the form of a predicted target address stored in the BTB 220. According to an embodiment of the present invention, the branch prediction may be provided with an estimate of the misprediction probability of the branch by a branch confidence estimator 226.

According to embodiments of the present invention, the determination of a candidate branch with a low confidence value (high misprediction probability) may be made using branch outcome history data. In one embodiment, any low confidence branch may be assigned a checkpoint and counter information about each checkpoint stored in a checkpoint buffer 224.

By using checkpoints to store architectural states, which may be created at selected points, a means of recovering from branch mispredictions, faults, and other errors is provided. Rather than build and maintain large physical register files, the embodiments of the present invention may make use of checkpoints to track instructions and preserve rename map tables and register files. In embodiments of the present invention, checkpoints may redirect fetch to the correct instruction and restoring the rename map before new instructions reach the rename stage. The map table may be restored from a checkpoint. It may also be incrementally restored from a non-speculative map table such as a retirement register alias table. It may also be incrementally restored from a history buffer that stores the speculative map table updates performed since the mispredicted branch was dispatched. The checkpoints may be generated to enable a restart from a previous architectural state by including copies of the rename map tables or register files such that they may be restored to their previous states.

Figure 3:
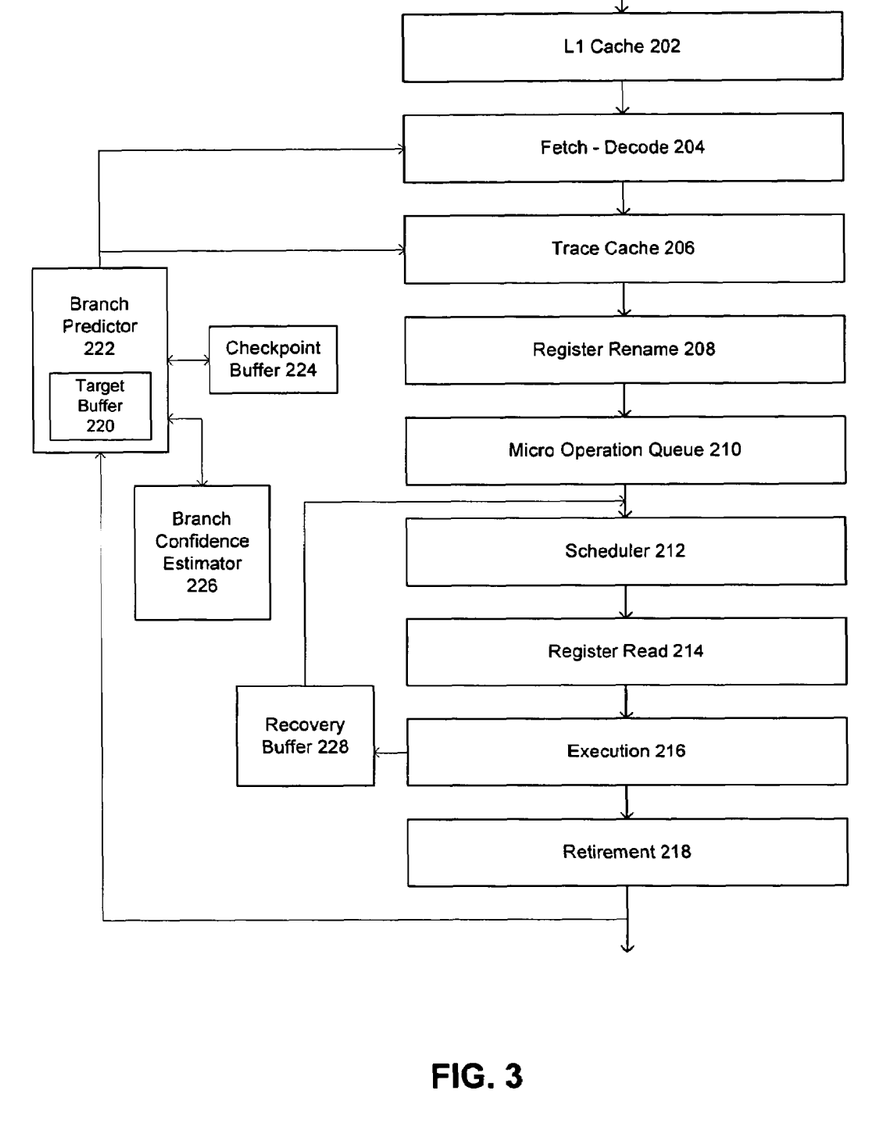
FIG. 3 illustrates a diagram of portions of a pipeline in a processor adapted for scalable rename map table recovery with a recovery buffer, according to an embodiment of the present invention.

Alternatively, as the diagram of FIG. 3 illustrates, a recovery buffer 228 may be used to store previously executed instructions for possible use in selective recovery operations. In any of these embodiments, the checkpoints may be used to support selective recovery.

Recovering rename map tables using checkpoints provides a non-serial approach that may allow for scalable renaming operations. The placement of checkpoints at every single branch may incur a high overhead. Thus, the number of rename map table checkpoints or simply checkpoints may be carefully limited to selective points, preferably at branches having a high misprediction probability.

The misprediction probability of a given branch may be determined with the use of a branch confidence estimator (BCE), such as the BCE 226 described above with respect to FIG. 2.

According to one embodiment of the present invention, on a branch misprediction, execution may restart from the nearest checkpoint prior to the mispredicted branch. If the checkpoint is not at the mispredicted branch, good instructions between the checkpointed instruction and the mispredicted branch may need to be re-executed. To minimize this overhead, which may also be called checkpoint overhead, the BCE may cover a large fraction of mispredicted branches. In one embodiment, the branch predictor may use a table of 4-bit saturating counters indexed using an XOR of the branch address and the global branch history. According to this embodiment, the counters may be reset to zero when the corresponding branch is mispredicted and incremented on a correct branch prediction. A branch with a high counter value may be predicted as high confidence, and other branches may be predicted as low confidence. This application may provide a maximum set of checkpoints from which the branch predictor may further determine confidence levels of branches, and may determine which branches are associated with checkpoints.

The checkpoint buffer, such as checkpoint buffer 224, may keep track of rename map table checkpoints. Each checkpoint may correspond to a very large number of instructions, and their numbers may vary across checkpoints. In one example, each checkpoint entry may correspond to 256 instructions and thus eight checkpoints may be sufficient to support 2048 instructions.

According to embodiments of the present invention, checkpoints allocation and reclamation may occur in a first-in-first-out order. A checkpoint may be allocated only if a free checkpoint is available, and each checkpoint buffer entry may have a counter to determine when the corresponding allocated checkpoint can be freed. The counter may track completion of instructions associated with the checkpoint, that is, the counter may be incremented when an instruction is allocated and decremented when the instruction completes execution. Counter overflow may be prevented by forcing a new checkpoint. If the checkpoint buffer is full, an instruction may be stalled until a checkpoint is freed. The oldest checkpoint may be reclaimed when its associated counter has a value which indicates that the instructions associated with the checkpoint have completed execution, for example, a counter value of zero. Prior to a checkpoint being reclaimed or retired, the next checkpoint may be allocated to ensure that there is always forward progress along the various branches and that there is always at least one checkpoint to which to return in the event of an exception, branch misprediction, or other fault.

Each instruction may have an identifier associating it to a specific checkpoint. Instructions may use this identifier to access the appropriate checkpoint buffer for incrementing and decrementing the counter. This identifier may also be used to select instructions to be squashed or committed. As soon as the last instruction belonging to a checkpoint completes, all instructions in that checkpoint may be retired instantly and the associated checkpoint may be reclaimed. This may provide the ability to commit hundreds of instructions instantly, thereby potentially removing the in-order and serial retirement constraints enforced by a re-order buffer (ROB).

Figure 4:
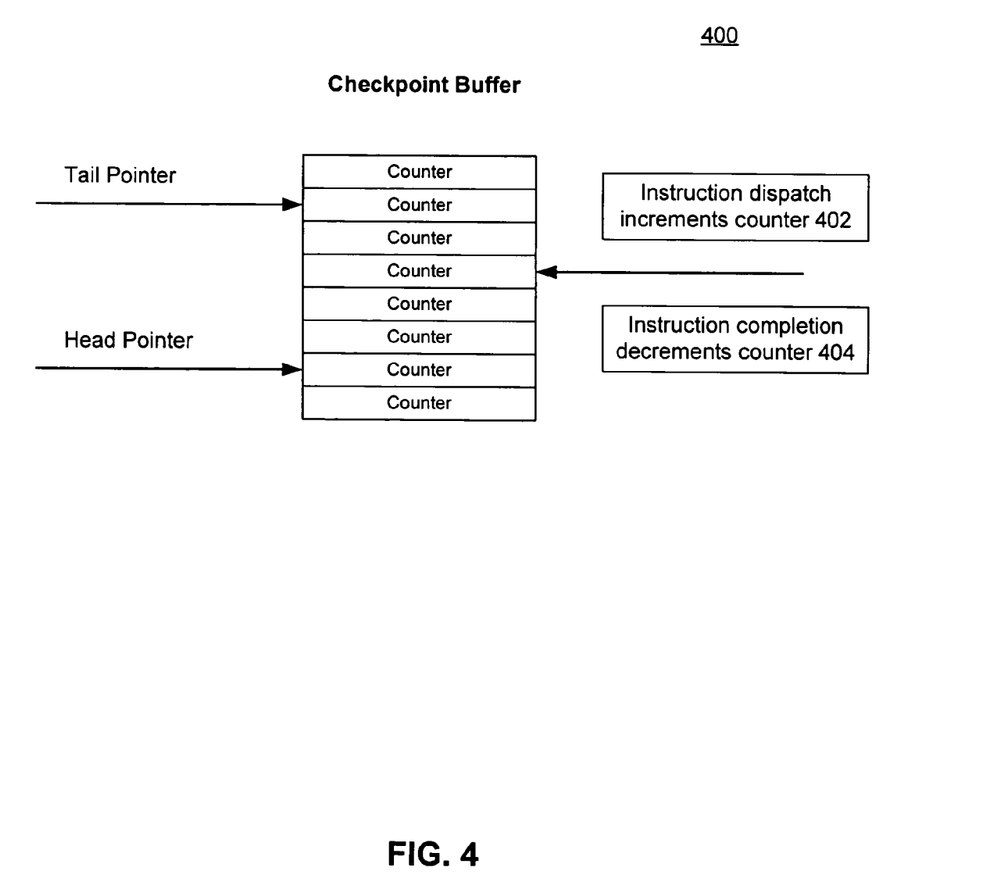
FIG. 4 illustrates a diagram of a checkpoint buffer, according to an embodiment of the present invention.

FIG. 4 illustrates a diagram of the checkpoint buffer 400, according to an embodiment of the present invention. As described in more detail below, when instructions are dispatched, one or more counters within the checkpoint buffer 400 may be incremented, as indicated by block 402. Furthermore, when instructions are completed, one or more counters within the checkpoint buffer 400 may be decremented, as indicated by block 404. Specific embodiments of the present invention discuss implementations of the checkpoint buffer herein, but the present invention is not limited to these specific implementations. One of ordinary skilled in the art would recognize that other type of configurations could be used to perform the functionality of the checkpoint buffer, based on at least from the teachings described herein.

While a checkpoint may be placed at any branches, such as low confidence branches, other branches within the checkpoint may be mispredicted, forcing a recovery to a prior checkpoint. To prevent the same branches from being repeatedly mispredicted, on a re-execution from a checkpoint, the branch outcome from the previously aborted execution may be used rather than a prediction. This may, in one embodiment, be done by storing the branch distance (in number of branches) from the checkpoint and the associated branch outcome. This outcome may be used on a restart thus preventing repeated mispredictions. A checkpoint may include any number of instructions, including a single instruction. Thus, forward progress may always be guaranteed, even under pathological cases, by forcing a checkpoint right after the instruction at the head of the instruction window and thus allowing the instruction at the head of the window to commit. This is exactly the same forward progress solution used in a ROB-based architecture in which the head of the ROB is always allowed to commit, even in the presence of external events such as snoop invalidations in multiprocessors.

According to embodiments of the present invention, rather than using the ROB for branch recovery, the checkpoint buffer may be used for performing recovery. The size of the instruction window may not be limited by the rename map table checkpoints size because checkpoints may be created infrequently at low confidence branch points in the instruction window or when necessary, such as at architecture-specific serializing instructions.

The embodiments of the present invention may replace the ROB-based designs with a micro-architecture which may use confidence-based checkpoints and checkpoint counters for branch recovery, where each checkpoint corresponds to a group of instructions. A branch misprediction may result in a rollback to the closest checkpoint. The embodiments described herein may perform register reclamation using counters, thereby decoupling register reclamation from the in-order instruction commit semantics provided by the ROB. Additionally, the checkpoints may also be used for recovering from faults and in providing precise interrupts.

The checkpoint based architecture may use numerous counters. Counters may be used for tracking allocated instructions, for reclaiming registers, for counters in store queues. The present invention may ease counter management by allowing all instructions to eventually decrement the counters, including squashed instructions that are merely draining out of the pipeline. In one embodiment, a counter's associated resources may be released only when a counter reaches zero. For example, if an instruction is squashed due to a branch misprediction, the instruction may still decrement any related counters even as it is draining out of the pipeline without affecting any other architectural state. Thus, no global reset signals may be required for counters in the various structures.

Figure 5:
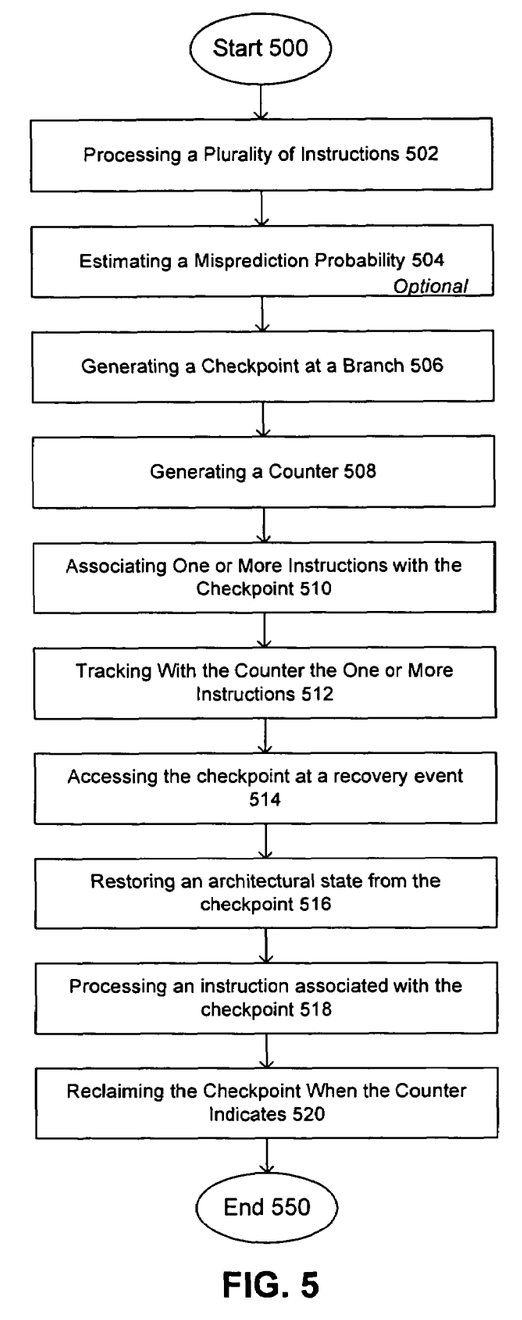
FIGS. 5-6 illustrate flow diagrams of a scalable rename map table recovery method, according to an embodiment of the present invention.
Figure 6:
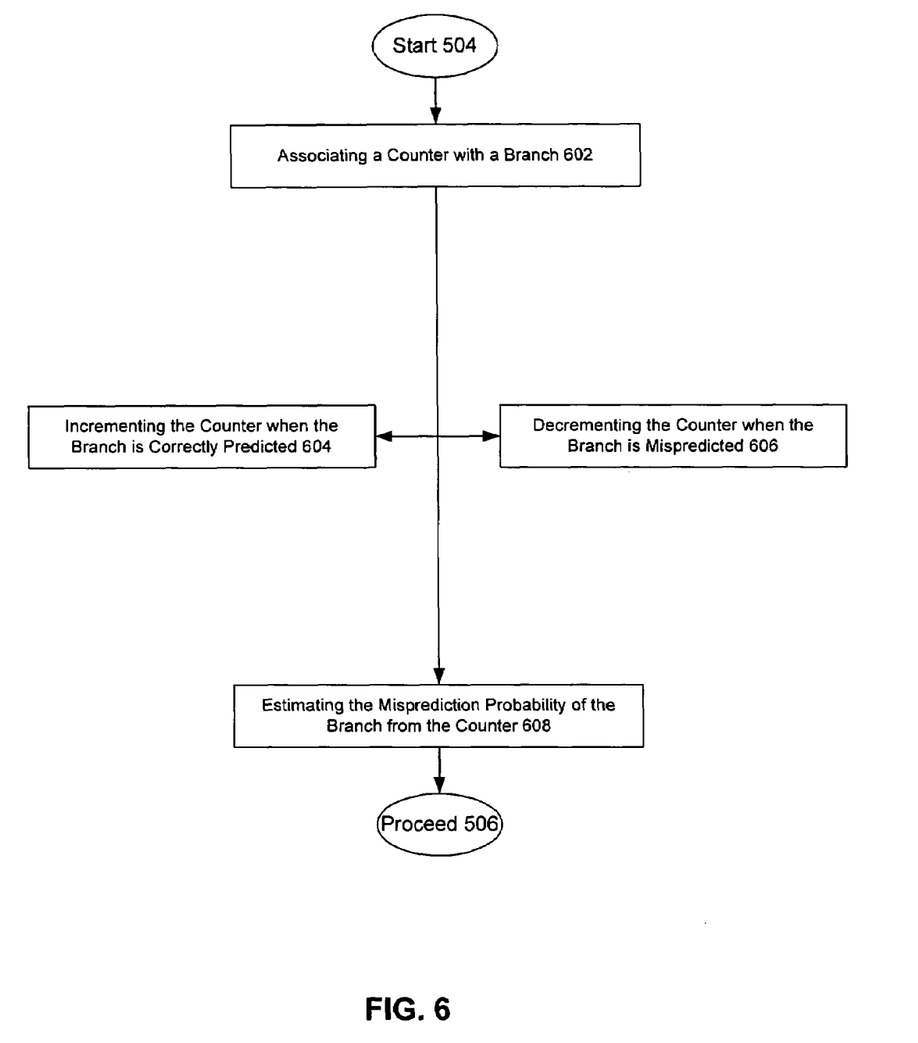

In accordance with the above-described embodiments, the present invention is now illustrated with respect to FIGS. 5-6. As discussed herein, the branch predictor 222, branch confidence estimator 226, and checkpoint buffer 224 manage the scalable rename map table checkpoints for recovering from branch mispredictions.

FIG. 5 is a flow diagram of a scalable rename map table recovery method, according to an embodiment of the present invention. At step 500, the process starts and proceeds to the processing of a plurality of instructions that include a plurality of branches (step 502). A microprocessor, as described in further detail below, may process instructions in an out-of-order manner, where instructions may be broken down into segments and fed into one or more pipelines. The microprocessor may scan the incoming instruction stream, decide how to rearrange the plurality of instructions, and ensure that a reordered instruction does not depend on a result from a prior instruction that has not yet completed execution. According to the embodiments of the present invention, the dependency between two instructions may cause the pipeline(s) to stall as they wait for the related instruction(s) to finish. Additionally, the process of branch prediction may be employed to prevent stalls. When the processor encounters a fork in the program's path, for example, caused by an IF-THEN or similar conditional statement in the program code), it may then predict which path the program will take. If the processor guesses correctly, then it gets a head start on executing those instructions. If it guesses incorrectly, however, it may need to flush the incorrectly predicted instructions from the pipelines and fetch the correct ones. Thus, the process at step 502 may begin by processing a plurality of instructions and proceeds to step 504.

At optional step 504, the processor estimates a misprediction probability for each of the plurality of branches. In one embodiment, the branch predictor 222, using both the branch confidence estimator 226 and checkpoint buffer 224, may operate to estimate the misprediction probability. As described above, the confidence estimator may utilize historical misprediction information. The process then proceeds to step 506.

At step 506, the processor generates a checkpoint at a branch having a high misprediction probability in a checkpoint buffer having at least one checkpoint buffer entry. The entry of the checkpoint may provide a means to recover from a branch misprediction, which may be more likely at this determined branch given the estimation of a misprediction probability. At the next step 508, the processor generates a counter for the at least one checkpoint buffer entry so that the checkpoint buffer may, according to embodiments of the present invention, manage the branch and any recovery. The process proceeds to step 510.

At step 510, the processor associates one or more instructions from the plurality of instructions with the checkpoint and in step 512, the processor tracks with the counter the one or more instructions from the plurality of instructions associated with the checkpoint. During the processing of instructions, as described herein, the association with the checkpoint may become the principle locus for tracking the progress of the processor. Once the associations are made, the processor may continue to process, estimate, track and associate with additional checkpoints. The process then continues to step 514.

Steps 514-518 are contingent upon the occurrence of a recovery event. Upon the occurrence of a recovery event, the process may proceed to step 514, and access the checkpoint associated with mispredicted branch. Once accessed, the architectural state is restored in step 516. In step 518, the process restarts processing prior to where the recovery event occurred, as per the association with the checkpoint. The process may continue processing to step 520 to reclaim the checkpoint or may otherwise continue to step 550, as one of ordinary skill in the art would recognize, based at least on the teachings presented herein.

In step 520, when the processor either completes processing or performing recovery operations, it reclaims the checkpoint when the counter indicates. In one embodiment, this may be when one or more instructions from the plurality of instructions associated with the checkpoint have been completed. The process then proceeds to conclusion at step 550, from which point the process may begin again at step 500. In an alternative embodiment, the processor may perform, at various stages, the steps of FIG. 5 in a parallel manner and in multiple instances.

In an alternative embodiment of the present invention, the checkpoint may be generated when a checkpoint buffer entry is available. Additionally, the processor may process beyond the branch due to be associated with the checkpoint without generating the checkpoint when the checkpoint buffer entry is not available. The tracking may also include operations where the processor increments the counter when the one or more instructions is allocated, and decrements the counter when the one or more instructions completes execution.

The retirement operations of embodiments of the present invention may be implemented where checkpoints are reclaimed in a first-in-first-out order or where an oldest checkpoint is reclaimed when a subsequent checkpoint is generated.

In alternative embodiments, the checkpoint buffer 224 may operate where one or more additional instructions from the plurality of instructions are associated with an existing checkpoint when the misprediction probability of the one or more additional instructions is determined. Furthermore, one or more of the checkpoints may be combined, thus combining their associated instructions, when the misprediction probability of the one or more additional instructions is determined.

FIG. 6 illustrates a flow diagram of an embodiment for estimating the misprediction probability (step 504) by associating a counter with one of said plurality of branches in step 602. The processor then manages the counter, for example, it may increment the counter when said one of said plurality of branches is correctly predicted in step 604 or it may decrement said counter when said one of said plurality of branches is mispredicted in step 606. The counter, according to embodiments of the present invention, may be stored within the checkpoint buffer 224. In step 608, the processor may estimate the misprediction probability of the one of the plurality of branches from the counter's value and thus return to step 506, as described above and illustrated in FIG. 5.

The processor of the present invention, according to the embodiments described above and the environments described below may include a first circuit adapted to process a plurality of instructions that include a plurality of branches. The first circuit may include the branch predictor 222 adapted to estimate a misprediction probability for each of the plurality of branches. The checkpoint buffer 224 may also store one or more counters. A second circuit adapted to generate a checkpoint at a branch having a high misprediction probability in the checkpoint buffer 224 having at least one checkpoint buffer entry may include the first circuit and the branch target buffer 220, and may also include the branch confidence estimator 226.

The second circuit may be adapted to generate a counter for each checkpoint buffer entry, and to associate one or more instructions from the plurality with the checkpoint. Additionally, the second circuit may be further adapted to track the one or more instructions from the plurality associated with the checkpoint with the counter, and to reclaim the checkpoint when the counter indicates that the one or more instructions from the plurality of instructions associated with the checkpoint have been completed.

In one embodiment, the branch confidence estimator 226 may further comprise a counter associated with the branch having a high misprediction probability and adapted to track when the branch is mispredicted. The counter may be a saturation counter, and implemented as one of ordinary skill in the art would recognized, based at least on the teachings provided herein.

In one embodiment, the first circuit may further comprise a recovery buffer 228. The recovery buffer, as described above with respect to FIG. 3, operating to assist in the recovery operations between the execution of instructions within the pipeline back to a stage prior to the scheduling of those instructions.

In this detailed description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In this detailed description and claims, the term "coupled," along with its derivatives, may be used. It should be understood that "coupled" may mean that two or more elements are in direct physical or electrical contact with each other or that the two or more elements are not in direct contact but still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 7:
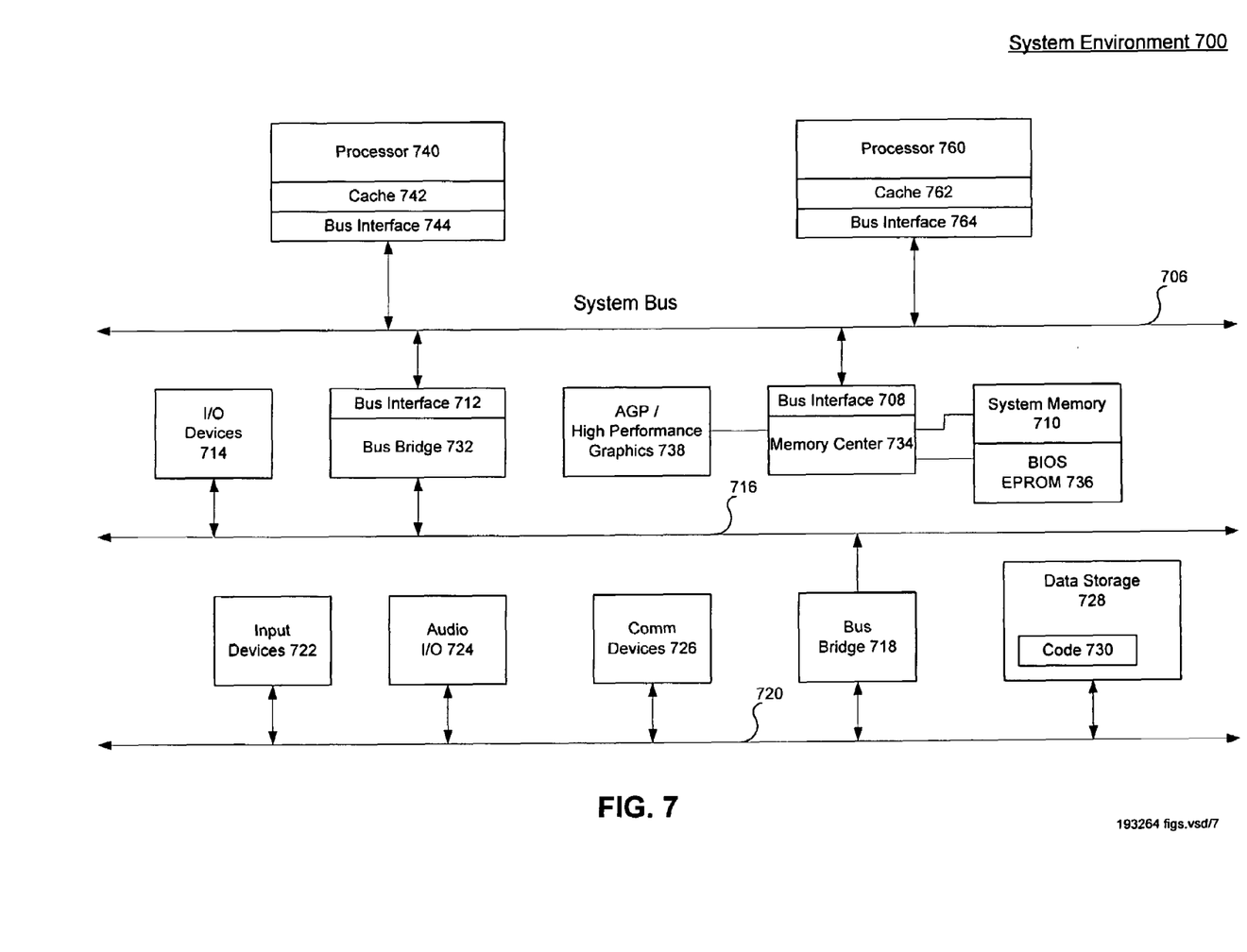
FIGS. 7-8 illustrates diagrams of system environments capable of being adapted to perform the operations of scalable rename map table recovery, according to embodiments of the present invention.
Figure 8:
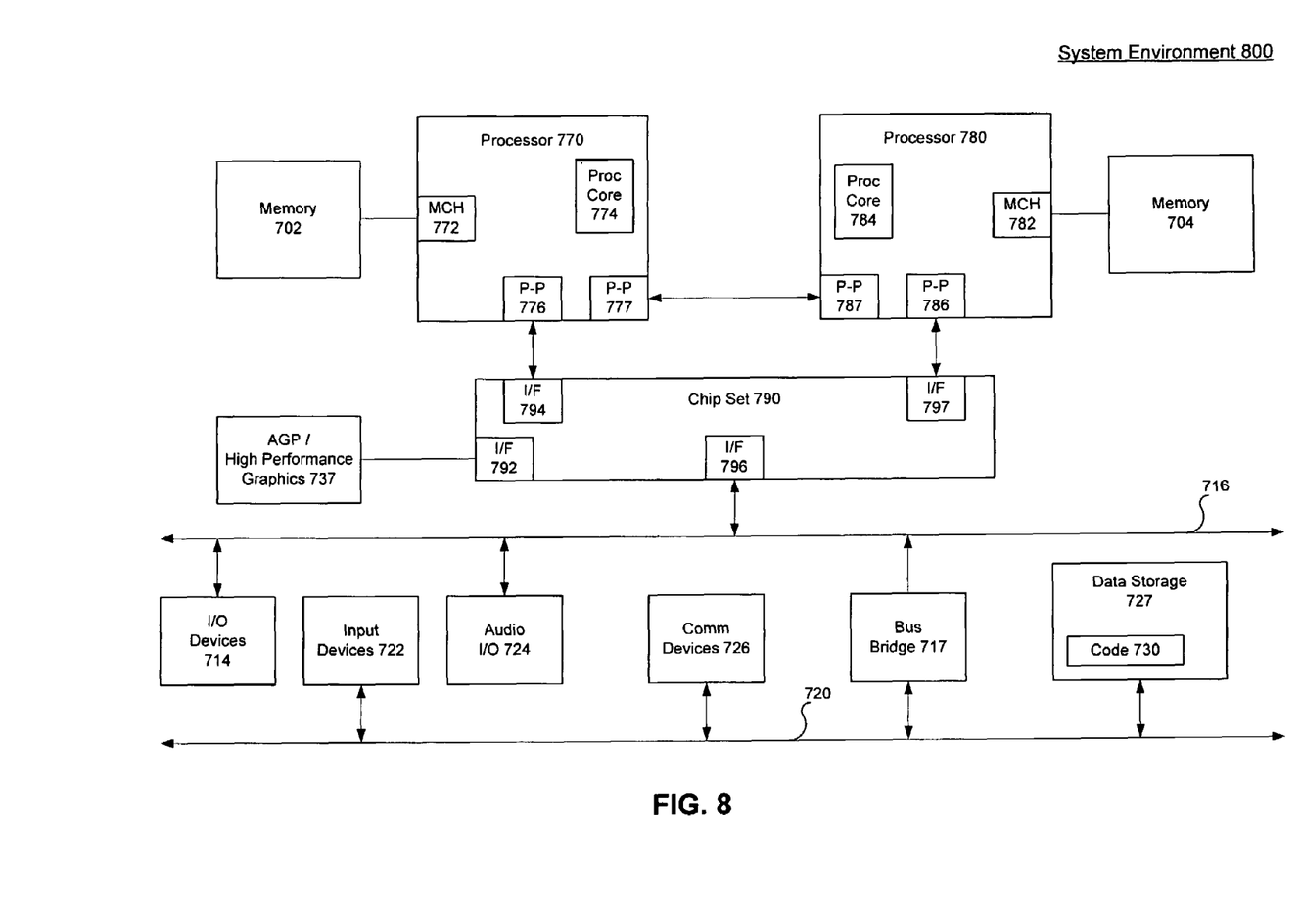

Specifically, and only by way of example, the present invention (i.e., the checkpoint enabled circuits of FIG. 2 or any part thereof) may be implemented using one or more microprocessor architectures or a combination thereof and may be implemented with one or more memory hierarchies. In fact, in one embodiment, the invention may be directed toward one or more processor environments capable of carrying out the functionality described herein. An example of system environments 700 and 800 are shown in FIGS. 7-8 and include one or more central processing units, memory units, and buses. The system environments 700 and 800 may include a core logic system chip set that connects a microprocessor to a computing system. Various microprocessor architecture embodiments are described in terms of these exemplary micro-processing and system environments. After reading this description, it will become apparent to a person of ordinary skill in the art how to implement the invention using other micro-processing and/or system environments, based at least on the teachings provided herein.

Referring now to FIGS. 7 and 8, schematic diagrams of systems including a processor supporting execution of speculative threads are shown, according to two embodiments of the present invention. The system environment 700 generally shows a system where processors, memory, and input/output devices may be interconnected by a system bus, whereas the system environment 800 generally shows a system where processors, memory, and input/output devices may be interconnected by a number of point-to-point interfaces.

The system environment 700 may include several processors, of which only two, processors 740, 760 are shown for clarity. Processors 740, 760 may include level one (L1) caches 742, 762. The system environment 700 may have several functions connected via bus interfaces 744, 764, 712, 708 with a system bus 706. In one embodiment, system bus 706 may be the front side bus (FSB) utilized with Pentium-.RTM. class microprocessors. In other embodiments, other busses may be used. In some embodiments memory center 734 and bus bridge 732 may collectively be referred to as a chip set. In some embodiments, functions of a chipset may be divided among physical chips differently from the manner shown in the system environment 700.

Memory center 734 may permit processors 740, 760 to read and write from system memory 710 and/or from a basic input/output system (BIOS) erasable programmable read-only memory (EPROM) 736. In some embodiments BIOS EPROM 736 may utilize flash memory. Memory center 734 may include a bus interface 708 to permit memory read and write data to be carried to and from bus agents on system bus 706. Memory center 734 may also connect with a high-performance graphics circuit 738 across a high-performance graphics interface. In certain embodiments the high-performance graphics interface may be an advanced graphics port (AGP) interface. Memory center 734 may direct read data from system memory 710 to the high-performance graphics circuit 738 across high-performance graphics interface.

The system environment 800 may also include several processors, of which only two, processors 770, 780 are shown for clarity. Processors 770, 780 (which include processor cores 774, 784) may each include a local memory channel hub (MCH) 772, 782 to connect with memory 702, 704. Processors 770, 780 may exchange data via a point-to-point interface using point-to-point interface circuits 777, 787. Processors 770, 780 may each exchange data with a chipset 790 via individual point-to-point interfaces using point to point interface circuits 776, 794, 786, 797. Chipset 790 may also exchange data with a high-performance graphics circuit 737 via a high-performance graphics interface 792.

In the system environment 700, bus bridge 732 may permit data exchanges between system bus 706 and bus 716, which may in some embodiments be a industry standard architecture (ISA) bus or a peripheral component interconnect (PCI) bus. In the system environment 800, chipset 790 may exchange data with a bus 716 via a bus interface 796. In either system, there may be various input/output I/O devices 714 on the bus 716, including in some embodiments low performance graphics controllers, video controllers, and networking controllers.

Another bus bridge 718, 717 may in some embodiments be used to permit data exchanges between bus 716 and bus 720. Bus 720 may in some embodiments be a small computer system interface (SCSI) bus, integrated drive electronics (IDE) bus, or universal serial bus (USB) bus. Additional I/O devices may be connected with bus 720. These may include input devices 722, which may include, but are not limited to, keyboards, pointing devices, and mice, audio I/O 724, communications devices 726, including modems and network interfaces, and data storage devices 728, 727. Software code 730 may be stored on data storage device 728, 727. In some embodiments, data storage device 728, 727 may be, for example, but is not limited to, a fixed magnetic disk, a floppy disk drive, an optical disk drive, a magneto-optical disk drive, a magnetic tape, or non-volatile memory including flash memory.

Figure 9:
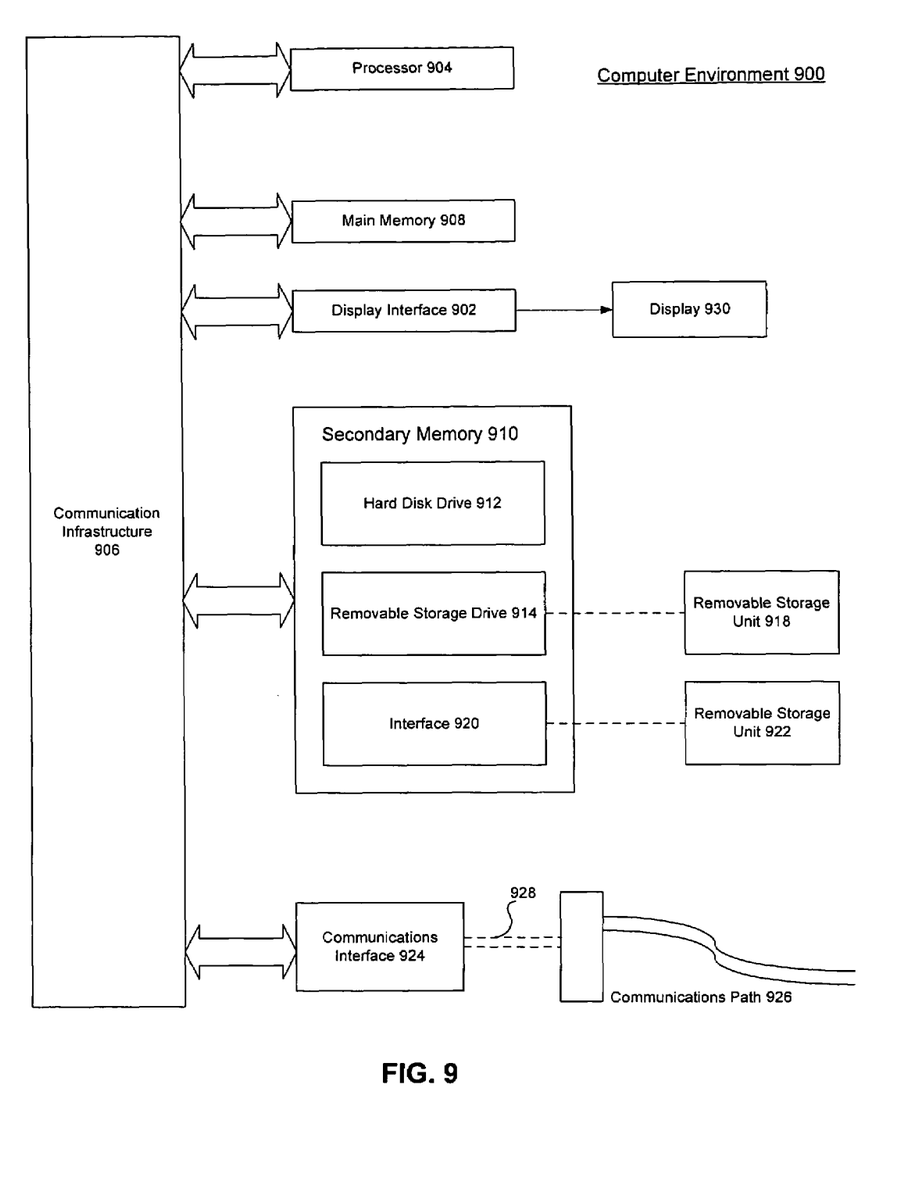
FIG. 9 illustrates a diagram of a computing environment capable of being adapted to perform the operations of scalable rename map table recovery, according to an embodiment of the present invention.

The present invention (i.e., the rename map table recovery system or any part thereof) may be implemented using hardware, software or a combination thereof and may be implemented in one or more computer systems or other processing systems. In fact, in one embodiment, the invention may comprise one or more computer systems capable of carrying out the functionality described herein. An example of a computer system 900 is shown in FIG. 9. The computer system 900 may include one or more processors, such as processor 904. The processor 904 may be connected to a communication infrastructure 906 (e.g., a communications bus, cross over bar, or network). Various software embodiments are described in terms of this exemplary computer system. After reading this description, it will become apparent to a person skilled in the relevant art(s) how to implement the invention using other computer systems and/or computer architectures.

Computer system 900 may include a display interface 902 that may forward graphics, text, and other data from the communication infrastructure 906 (or from a frame buffer not shown) for display on the display unit 930.

Computer system 900 may also include a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc, but which is not limited thereto. The removable storage drive 914 may read from and/or write to a removable storage unit 918 in a well known manner. Removable storage unit 918, may represent a floppy disk, magnetic tape, optical disk, etc. which may be read by and written to by removable storage drive 914. As will be appreciated, the removable storage unit 918 may include a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include, but are not limited to, a program cartridge and cartridge interface (such as that found in video game devices), a removable memory chip (such as an EPROM, or PROM) and associated socket, and/or other removable storage units 922 and interfaces 920 that may allow software and data to be transferred from the removable storage unit 922 to computer system 900.

Computer system 900 may also include a communications interface 924. Communications interface 924 may allow software and data to be transferred between computer system 900 and external devices. Examples of communications interface 924 may include, but are not limited to, a modem, a network interface (such as an Ethernet card), a communications port, a PCMCIA slot and card, etc. Software and data transferred via communications interface 924 are in the form of signals 928 which may be, for example, electronic, electromagnetic, optical or other signals capable of being received by communications interface 924. These signals 928 may be provided to communications interface 924 via a communications path (i.e., channel) 926. This channel 926 may carry signals 928 and may be implemented using wire or cable, fiber optics, a phone line, a cellular phone link, an RF link and/or other communications channels.

In this document, the terms "computer program medium" and "computer usable medium" are used to generally refer to media such as, but not limited to, removable storage drive 914, a hard disk installed in hard disk drive 912, and signals 928. These computer program media are means for providing software to computer system 900.

Computer programs (also called computer control logic) may be stored in main memory 908 and/or secondary memory 910. Computer programs may also be received via communications interface 924. Such computer programs, when executed, enable the computer system 900 to perform the features of the present invention as discussed herein. In particular, the computer programs, when executed, may enable the processor 904 to perform the present invention in accordance with the above-described embodiments. Accordingly, such computer programs represent controllers of the computer system 900.

In an embodiment where the invention is implemented using software, the software may be stored in a computer program product and loaded into computer system 900 using, for example, removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). As discussed above, the invention is implemented using any combination of hardware, firmware and software.

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above described exemplary embodiments, but should be defined only in accordance with the following claims and their equivalents.

What is claimed is:

1. A method, comprising:
    identifying from a plurality of branches a low confidence branch;
    assigning to the low confidence branch a checkpoint and counter information about the checkpoint in a checkpoint buffer, wherein said plurality of branches include one or more instructions;
    associating said one or more instructions with said checkpoint; and
    tracking with said counter said one or more instructions associated with said checkpoint.

2. The method of claim 1, further comprising: accessing said checkpoint at the occurrence of a recovery event; restoring an architectural state associated with said checkpoint; and processing at least one instruction from said one or more instructions associated with said checkpoint.

3. The method of claim 1, further comprising: reclaiming said checkpoint when said counter indicates that said one or more instructions associated with said checkpoint have been completed.

4. The method of claim 1, said identifying a low confidence branch further comprising: estimating a misprediction probability for one or more of said plurality of branches.

5. The method of claim 1, wherein generating said checkpoint occurs when a checkpoint buffer entry is available.

6. The method of claim 1, further comprising processing beyond said plurality of branches without generating said checkpoint when said checkpoint buffer entry is not available.

7. The method of claim 1, wherein said tracking step further comprises: incrementing said counter when said one or more instructions is allocated; and decrementing said counter when said one or more instructions completes execution.

8. The method of claim 1, wherein checkpoints are reclaimed in a first-in-first-out order.

9. An apparatus, comprising:
    a branch confidence estimator to identify a low confidence branch from a plurality of branch;
    a branch predictor to assign a checkpoint to the identified low confidence branch;
    and a checkpoint buffer to store one or more counters, wherein said checkpoint buffer has at least one checkpoint buffer entry; wherein said branch predictor generates a counter for said at least one checkpoint buffer entry to associate one or more instructions with said checkpoint, and wherein said branch predictor tracks said one or more instructions using said counter.

10. The apparatus of claim 9, wherein said branch predictor accesses said checkpoint at the occurrence of a recovery event, restores an architectural state associated with said checkpoint, and processes at least one instruction from said one or more instructions associated with said checkpoint.

11. The apparatus of claim 9, wherein said branch predictor reclaims said checkpoint when said counter indicates that said one or more instructions associated with said checkpoint have been completed.

12. The apparatus of claim 9, wherein said branch confidence estimator accesses misprediction history information.

13. The apparatus of claim 12, wherein said branch confidence estimator further comprises a counter associated with said low confidence branch and adapted to track when said branch is mispredicted.

14. The apparatus of claim 9, further comprising: a recovery buffer to store previously executed instructions for use in misprediction recovery.

15. The apparatus of claim 9, wherein said branch predictor further comprises a branch target buffer to store said one or more instructions.

16. A system, comprising:
    a processor including a branch confidence estimator to identify a low confidence branch from a plurality of branches and a branch predictor to assign a checkpoint at the identified low confidence branch, and a checkpoint buffer to store one or more counters, wherein said checkpoint buffer has at least one checkpoint buffer entry, wherein said branch predictor generates a counter for said at least one checkpoint buffer entry to associate one or more instructions with said assigned checkpoint, and wherein said branch predictor tracks said one or more instructions using said counter;

an interface to couple said processor to input-output devices; and a data storage coupled to said interface to receive code from said processor.

17. The system of claim 16, wherein said branch predictor accesses said checkpoint at the occurrence of a recovery event, restores an architectural state associated with said checkpoint, and processes at least one instruction from said one or more instructions associated with said checkpoint.

18. The system of claim 16, wherein said branch predictor reclaims said checkpoint when said counter indicates that said one or more instructions associated with said checkpoint have been completed.

19. The system of claim 16, wherein said branch confidence estimator accesses misprediction history information.

20. The system of claim 19, wherein said branch confidence estimator further comprises a counter associated with the assigned low confidence branch and adapted to track when said branch is mispredicted.

21. The system of claim 16, further comprising: a recovery buffer to store previously executed instructions for use in misprediction recovery.

22. The system of claim 16, wherein said branch predictor further comprises a branch target buffer to store said one or more instructions.

* * * * *